United States Patent
Jain et al.

(10) Patent No.: US 6,628,770 B1
(45) Date of Patent: Sep. 30, 2003

(54) DATA MINING OF CALLS BASED ON CALLED PARTY IDENTITY

(75) Inventors: Anuj Kumar Jain, Raleigh, NC (US); Robert J. Smith, Carrboro, NC (US)

(73) Assignee: Ericsson Inc., Research Triangle Park, NC (US)

( * ) Notice: Subject to any disclaimer, the term of this patent is extended or adjusted under 35 U.S.C. 154(b) by 607 days.

(21) Appl. No.: 09/651,716

(22) Filed: Aug. 31, 2000

(51) Int. Cl.[7] .............................................. H04M 3/42
(52) U.S. Cl. .............................. 379/207.14; 379/201.02
(58) Field of Search ....................... 379/201.01, 201.02, 379/201.12, 207.02, 207.14, 207.15, 218.01

(56) References Cited

U.S. PATENT DOCUMENTS

| | | | |
|---|---|---|---|
| 5,608,788 A | 3/1997 | Demlow et al. | 379/142.07 |
| 5,901,214 A * | 5/1999 | Shaffer et al. | 379/211.02 |
| 6,195,697 B1 * | 2/2001 | Bowman-Amuah | 709/224 |
| 6,459,779 B2 * | 10/2002 | Wardin et al. | 379/112.01 |
| 6,499,017 B1 * | 12/2002 | Feibelman et al. | 705/8 |

* cited by examiner

Primary Examiner—Harry S. Hong
(74) Attorney, Agent, or Firm—Coats & Bennett, P.L.L.C.

(57) ABSTRACT

A database of call information may be generated based on called numbers. When a called number is received from a user, the present invention determines whether the called party associated with the called number is a business. If the called number is associated with a business, information about the call is stored. If the called number is not associated with a business, the information is not stored, so as to protect privacy. The present invention may determine not only that the called number is associated with a business, but also what type of business. The call information, or information about a plurality of such calls, may be shared with a third party. The third party may or may not be a competitor of the business that was called. Armed with the call information, the third party may generate advertising directed at the calling party in response to being informed about the call. For instance, a third party competitor may email the calling party an electronic coupon or a notice about a current or upcoming sale.

29 Claims, 4 Drawing Sheets

US 6,628,770 B1

DATA MINING OF CALLS BASED ON CALLED PARTY IDENTITY

BACKGROUND OF THE INVENTION

The present invention relates to telecommunications, and more particularly to data mining of outgoing calls in a telecommunications system based on called party identity.

Businesses have long desired to leverage their advertising expenditures to get the greatest return. One way of doing so is to selectively target recipients of a business's advertising. For instance, a local pizza parlor may wish to mail advertising to people likely to order pizza. Realizing that people living many miles away would not be likely to order pizza from them, the pizza parlor, or more typically an advertising service acting on behalf of the pizza parlor, would access a database of addresses to filter down the mailing list to a more appropriate target audience. The advertising would then be mailed to the people living in the right areas.

While this approach to advertising helps control costs somewhat, it may still not be properly tailored for the business. For instance, the pizza parlor may not wish to send coupons to existing customers, but instead offer coupons only to people who have been ordering pizzas from a competitor. Or, the pizza parlor may want to target only those people who typically order pizza from competitors after 9:00 at night, so as to increase utilization of the pizza parlor's existing resources. However, determining who has been ordering from a competitor, and possibly when, is problematic with prior art techniques. Competitors are obviously unwilling to share customer data. Surveys, whether telephonic or mall-intercept, are often viewed by consumers as unwelcome, even intrusive. Thus, businesses must rely on fairly non-specific information when making advertising decisions.

BRIEF SUMMARY OF THE INVENTION

One aspect of the present invention focuses on gathering information about what businesses are being called by a user (or users). A database of call information is generated based on outgoing calls. When a called number is received from a user, the present invention determines whether the called party associated with the called number is a business, such as by consulting a reverse directory service. Preferably, the present invention determines not only that the called number is associated with a business, but also the type of business. If the called number is associated with a business, the call information, or information about a plurality of such calls, is stored. If the called number is not associated with a business, the information is not stored, so as to protect privacy. The stored call information may later be shared with interested third parties, such as advertising services.

In another aspect of the present invention, outgoing calls are filtered for calls to selected called numbers. If a call is initiated to one of these select numbers, the present invention notifies appropriate third parties of the call, giving suitable information about the call. The third party may be a competitor of the business that was called or some other third party subscriber to the data mining service. Based on this call information, such as when the call was placed and the duration of the call, some inferences about the nature of the call can be made. These inferences may then be used to provide the caller with additional useful services that the third party may offer. For instance, armed with the call information, the third party may generate advertising directed at the calling party in response to being informed about the call, such as by emailing the calling party an electronic coupon or a notice about a current or upcoming sale.

DETAILED DESCRIPTION OF THE INVENTION

Figure 1:
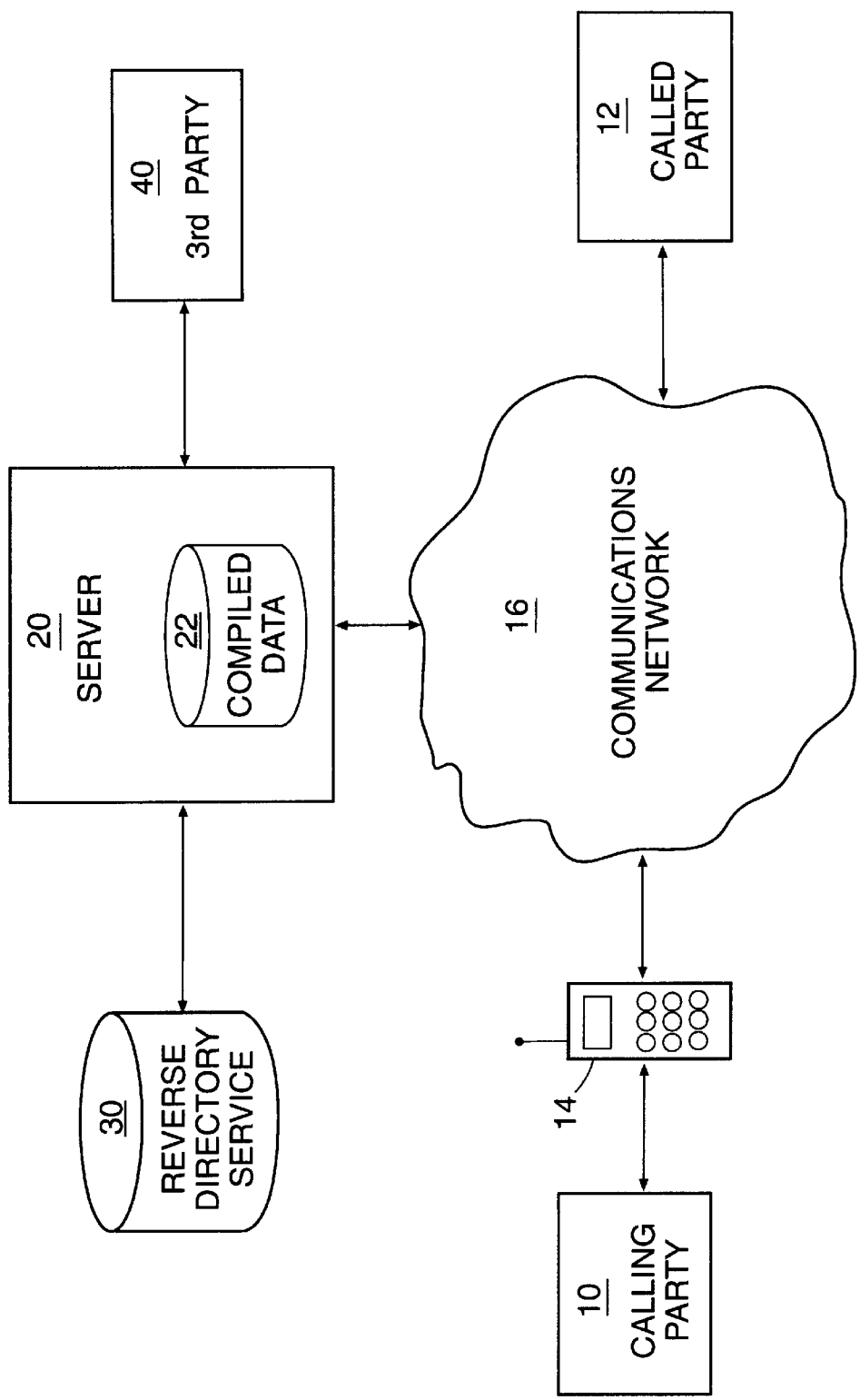
FIG. 1 shows a calling party communicating with a called party via a communications network equipped with the present invention.

FIG. 1 shows a calling party 10 connected to a called party 12 via a mobile terminal 14 and an associated communications network 16. The calling party 10 is the party initiating the communications session while the called party 12 is the party receiving the incoming call. In the simple illustrative example used herein, the calling party 110 is a consumer ordering pizza while the called party 12 is the pizza shop being called. While the illustrative communications network 16 connecting the two parties 10,12 in FIG. 1 is a wireless communications network 16 (such as a cellular telephone system), the communications network may comprise the Public Switched Telephone Network (PSTN), the Internet for voice-over-IP communications, or any other known communications network utilizing phone numbers.

A tracking server 20 is connected to the communications network 16, or may be a portion thereof. The tracking server 20 monitors the outgoing calls from mobile terminal 14 and performs the majority of the information transactional work of the present invention. The tracking server 20 includes a database 22, which may be referred to herein as the call tracking database 22. The tracking server 20 also communicates with a reverse directory service 30, typically through the communications network 16 or via the Internet.

Figure 2:
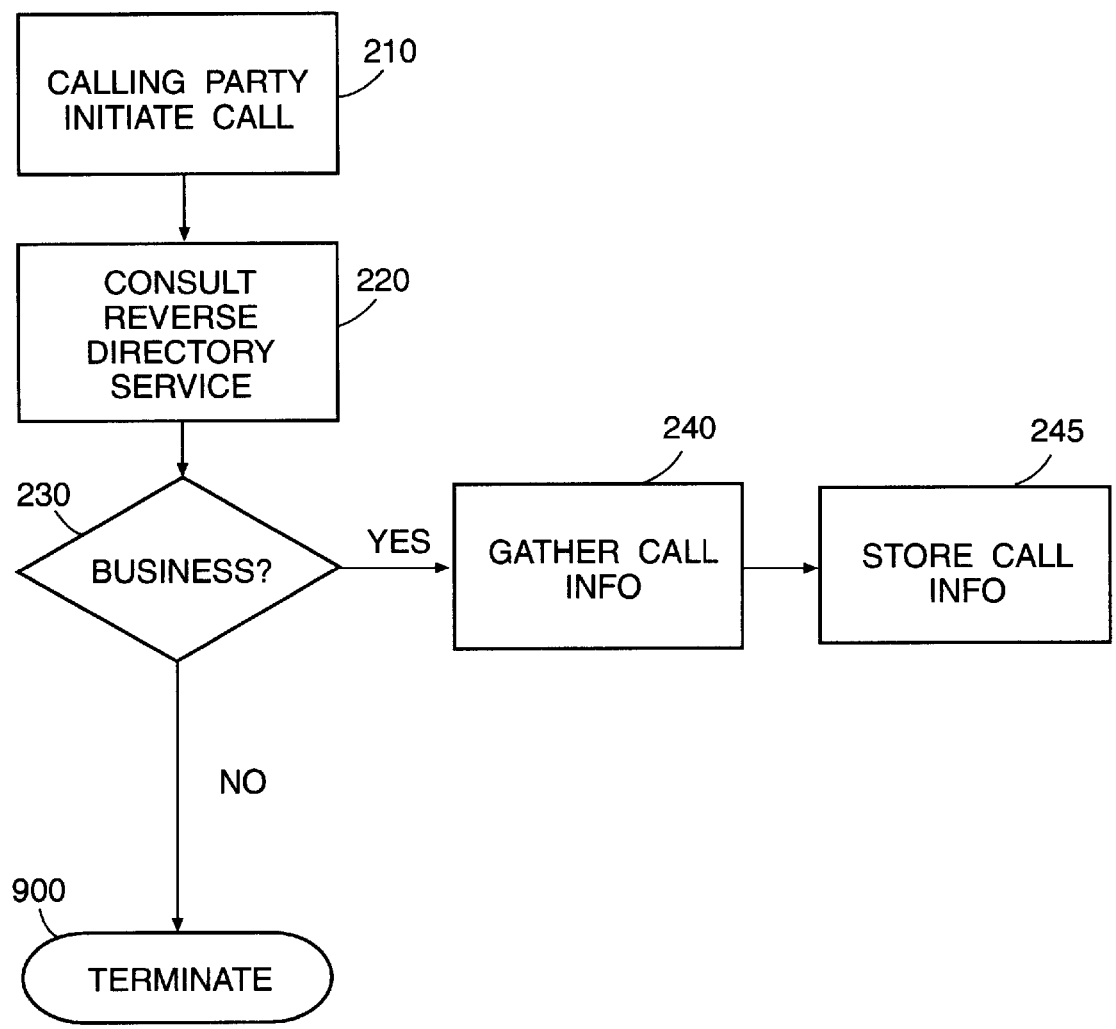
FIG. 2 shows a process flow for one aspect of the present invention.

FIG. 2 shows one aspect of the present invention. Initially, the user makes an outgoing call by dialing the appropriate number in any fashion known in the art (block 210). For ease of reference, this number will be referred to as the "called number." In the United States, this called number typically consists of ten digits, but may contain more. The entry and format of such called numbers, including speed dialing, are well known in the art and are therefore not discussed further herein. The communications network 16 notifies tracking server 20 that the mobile terminal 14 is attempting a call to the called number. The tracking server 20 then determines whether the called number belongs to a business or to a residence (block 220). To do this, the tracking server 20 will typically cause a so-called reverse look-up to be performed, such as by submitting a suitable request to a reverse directory service 30. One such reverse directory service 30 may be found at anywho.com/telq. The reverse directory service 30 should return the name of the business and an indication of whether the called number is a business or not (block 230). For instance, the reverse directory service 30 may provide a simple business yes/no flag to indicate whether or not the called number is associated with a business. If the called number corresponds to a residence, the process may stop (block 900). However, if the called number corresponds to a business, the reverse directory service 30 preferably also provides an indication of the type of business involved. For instance, the indication may be as simple as "restaurant," or "restaurant with delivery," or may be more complex such as "restaurant, Italian, inexpensive, pizza specialist," or the like. If the called number corresponds to a business, the tracking server 20 gathers information about the call and/or the calling party 10 ("call information"), requesting any additional information as necessary from the communications network 16 (block 240). By way of example, the time and duration of the call may be noted, along with the calling party's 10 current location and home address. This call information, including the called party information, is then stored (block 245) in the call tracking database 22. By following this process for a plurality of calls, the tracking server 20 may accumulate a significant amount of information about the calling habits of the calling party 10. Or, if a plurality of calling parties 10 are monitored, then the tracking server 20 may accumulate a significant amount of information about the calling habits of a plurality of calling parties 10. This information may then be passed on to advertising groups or other third parties 40 for use.

Figure 3:
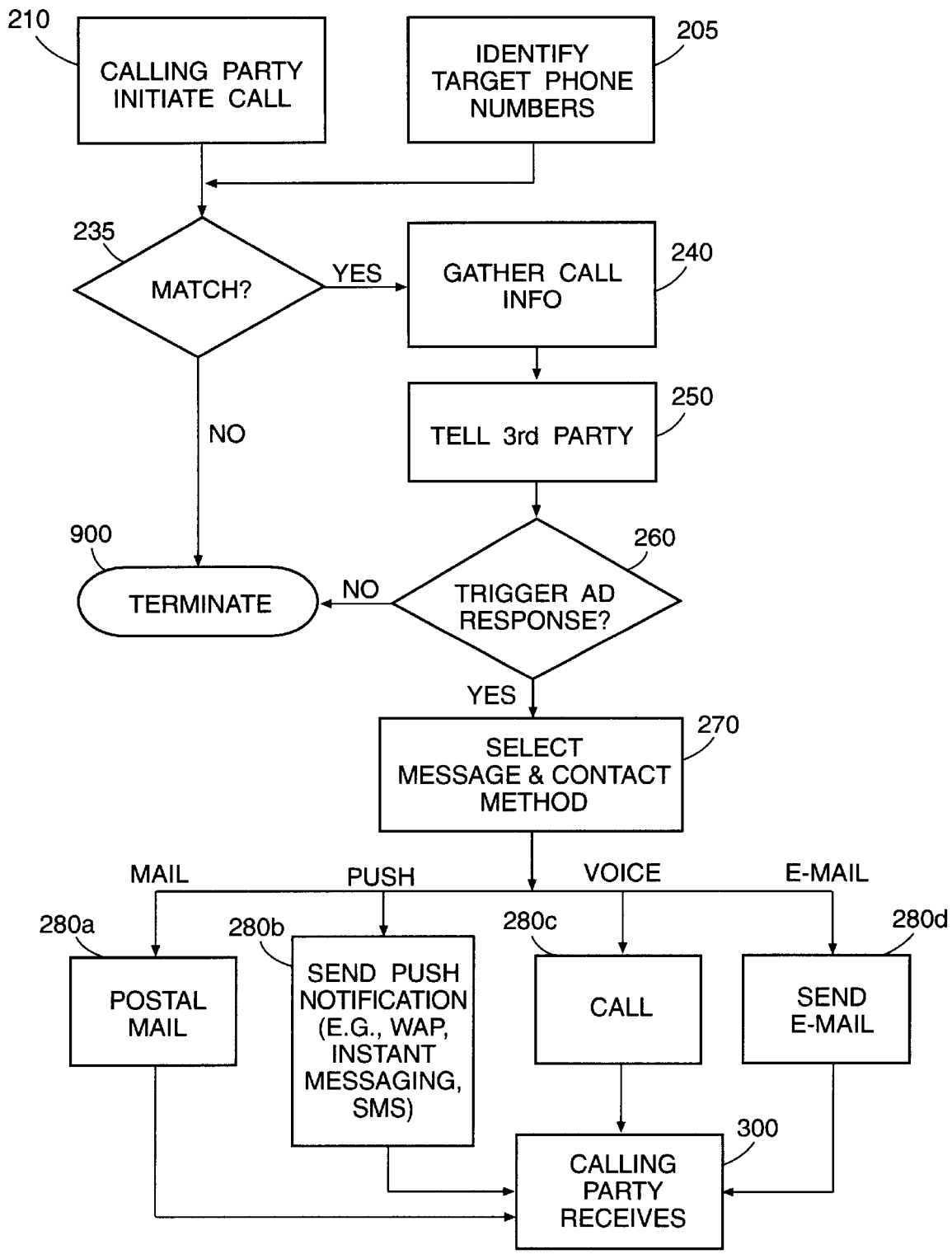
FIG. 3 shows a process flow for another aspect of the present invention.

In another aspect of the present invention shown in FIG. 3, the tracking server 20 may filter outgoing calls based on the presence of selected called number(s). That is, the tracking server 20 may monitor outgoing calls for the presence of a particular called number, or the presence of one of a set of called numbers. Continuing with a pizza parlor example, the tracking server 20 may monitor outgoing calls for called numbers corresponding to one or more competing pizza parlors. The phone numbers of the selected competitor(s) are determined (block 205); for ease of reference these phone numbers will be called the target list. Thereafter, when a monitored user places a call (block 210), the tracking server 20 is notified by the communications network 16 and compares the called number against the target list (block 235). If a match is not found, the process terminates (block 900). If a match is found (block 235), then the tracking server 20 may actively tell one or more interested third parties about the collected information (block 250). The third parties may do nothing in response to receiving the information. But, more typically, the third party 40 will try to respond to the information in a timely manner (block 260). In the illustrative example, the tracking server 20 may forward the information to one or more pizza parlors that are not party to the call. Preferably, this passing of call information is performed during the call, or at least shortly thereafter. Alternatively, the tracking database 22 may be used to supply the third party 40 with the call information in answer to a query from the third party 40 at a subsequent time. Each third party 40 then has an option to trigger an advertising response to the call (block 260). This response may take a wide variety of forms. For instance, the third party 40 may include the calling party 10 on its next coupon mailing list. Or, the third party 40 may call the calling party 10 and try to solicit business therefrom (block 280*c*). Preferably, however, the third party 40 examines the calling party's 10 preferences as part of the triggered response (block 270). These preferences help indicate what the calling party's desired methods of communication are and are 20 preferably supplied by the tracking server 20 as part of the call notification. For instance, the calling party 10 may have specified that promotions and/or coupons should be sent via email to a particular address (block 280*d*). If so, the third party competitor 40 should direct the coupon and/or promotional material generated in response to the call (collectively "advertising material") to that email address. Likewise, the calling party 10 may have indicated that some other avenue should be used, such as by sending or pushing an electronic notification, such using instant messaging, using SMS messages, or using WAP (block 280*b*). Or, the calling party 10 may have indicated that more traditional advertising routes should be used, such as traditional postal mail (block 280*a*) or receiving a traditional phone call (block 280*c*). The calling party 10 may, of course, consider the advertising material or ignore it (block 300).

It should be noted that the process shown in FIG. 3 does not require that a reverse directory service 30 be consulted. Instead, the target list of called numbers to be monitored may simply be generated once, manually or by any other method, and then used for the filtering reference. In addition, while call information about the identified calls may be stored in the tracking database 22, it need not be. Instead, the call information about the identified calls need only be passed on to the third party(s) 40, and need not be more than transiently stored by the tracking server 20.

Figure 4:
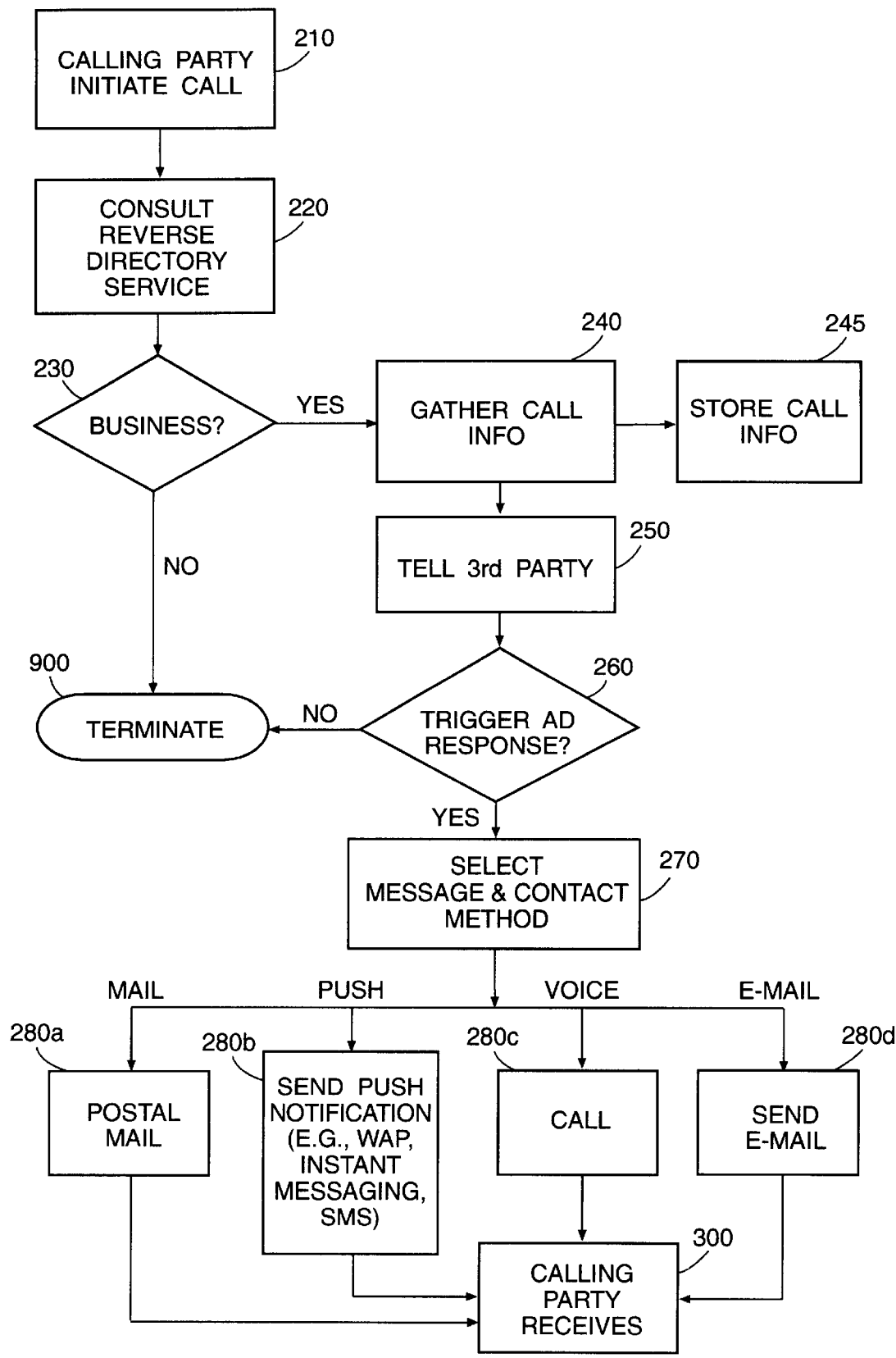
FIG. 4 shows a process flow for still another aspect of the present invention.

The processes of FIGS. 2 and 3 may be advantageously combined as shown in FIG. 4. In FIG. 4, the user makes an outgoing call by dialing the appropriate number in any fashion known in the art (block 210). The communications network 16 notifies tracking server 20 that the mobile terminal 14 is attempting a call to the called number. The tracking server 20 then determines whether the called number belongs to a business or to a residence (block 220), such as by submitting a suitable request to a reverse directory service 30. The reverse directory service 30 returns an indication of whether the called number is a business or not (block 230). If the called number corresponds to a residence, the process may stop (block 900). However, if the called number corresponds to a business, the tracking server 20 records gathers information about the call and/or the calling party 10, requesting any additional information as necessary from the communications network 16 (block 240), and then stores the call information in the call tracking database 22 (block 245). The tracking server 20 also actively notifies interested third parties 40 about the collected information (block 250). The third party(s) 40 may have been identified based on a subscription list, or by consulting a "normal" directory service for competing businesses. The third party (s) 40 may do nothing in response to receiving the information (block 900). But, more typically, the third party 40 will try to respond to the information in a timely manner (block 260). For instance, the server 20 may contact competitors of the called party 12. Continuing the illustrative example, the tracking server 20 may forward the information to a competing pizza shop that is not party to the call. The third party competitor 40 then triggers an advertising response to the call (block 260), with the advertising response preferably being routed to the calling party 10 based on calling party's 10 its preferences as supplied by the tracking server 20 (blocks 270–280). The calling party 10 may, of course, consider the advertising material or ignore it (block 300).

By way of example, assume that user A calls pizza parlor X to order a pizza for delivery by dialing "555-1034." In this case, user A is the calling party 10 and pizza parlor X is the called party 12. The communications network 16 handles this call in the usual way, but also notes that call information for calls from A's mobile terminal 14 are to be forwarded to tracking server 20. The tracking server 20 sends a request to a reverse directory service 30 based on the called number "555-1034," adding an appropriate area code, etc. as needed. The reverse directory service returns information that indicates that "555-1034" belongs to a business, in particular pizza parlor X. While this call is in progress, or thereafter, the tracking server 20 notifies pizza parlor Y that user A has called pizza parlor X, pursuant to an agreement between the operators of the tracking server 20 and pizza parlor Y. This notification may include information about the time and duration of the relevant call, user A's contact information, and the like. Pizza parlor Y then preferably automatically triggers an advertising response. After noting that user A prefers to receive advertising materials on the display of her mobile terminal, pizza parlor Y sends advertising materials to user A by "pushing" WAP advertising to user A. User A then receives the advertising materials from pizza parlor Y. In this way, pizza parlor Y may better target its advertising to reach consumers who order pizza from its competitors.

The process above may be followed for each call; alternatively, the tracking server 20 may wait to notify the third party 30 until a predetermined number of calls have occurred within a predefined time period, so as to filter out one-time events.

It may also be desirable to allow individual users to opt in or opt out of participation in systems according to the present invention, so as to help alleviate privacy concerns.

While the discussion above has used pizza parlors X and Y for illustrative purposes, the invention is not limited to such situations. Indeed, the present invention is suitable for a wide range of businesses, including without limitation car repair shops, pharmacies, health care providers, retail stores, on-line stores, and the like.

The present invention may, of course, be carried out in other specific ways than those herein set forth without departing from the scope of the invention. The present embodiments are, therefore, to be considered in all respects as illustrative and not restrictive, and all changes coming within the meaning and equivalency range of the appended claims are intended to be embraced therein.

What is claimed is:

1. A method of responding to a call from a calling party to a called party, comprising:
   receiving a first called number from said calling party for a first call;
   determining whether a called party associated with said first called number is a business based on said first called number; and
   storing information about said first call in response to said called party being a business.

2. The method of claim 1 wherein storing information about said first call in response to said called party being a business comprises storing information about said called party derived from said first called number.

3. The method of claim 2 wherein storing information about said called party derived from said first called number comprises storing the name of said called party as derived from said first called number.

4. The method of claim 1 wherein determining whether the called party associated with said first called number is a business based on said first called number further comprises determining the type of business associated with said called party based on said first called number.

5. The method of claim 1 wherein said calling party is a first calling party and further comprising:
   subsequently receiving said first called number from a second calling party for a second call;
   again determining whether the called party associated with said first called number is a business based on said first called number;
   storing information about said second call in response to said called party being a business; and
   supplying said information about said first call and said second call to a third party.

6. The method of claim 5 further comprising said third party triggering an advertising response based on said supplied information.

7. The method of claim 5 wherein said third party is a competitor of said called party and further comprising said competitor triggering an advertising response based on said supplied information.

8. The method of claim 1 further comprising identifying at least one third party subscriber based on said first called number and informing said third party subscriber of said first call.

9. The method of claim 8 wherein identifying at least one third party subscriber based on said first called number comprises identifying at least one competitor of said called party based on said first called number.

10. The method of claim 9 wherein determining whether the called party associated with said first called number is a business based on said first called number comprises requesting a reverse directory look-up of said first called number and wherein identifying at least one competitor for said called party comprises checking a business category provided as a response to said request.

11. The method of claim 3 further comprising said competitor triggering an advertising response in response to being informed of said first call.

12. The method of claim 11 wherein triggering an advertising response comprises sending an email message to said calling party in response to being informed of said first call.

13. The method of claim 11 wherein triggering an advertising response comprises mailing a postal advertisement to said calling party in response to being informed of said first call.

14. The method of claim 11 wherein triggering an advertising response comprises sending an SMS message to said calling party in response to being informed of said first call.

15. The method of claim 11 wherein triggering an advertising response comprises placing a phone call to said calling party in response to being informed of said first call.

16. The method of claim 11 wherein triggering an advertising response comprises sending an instant message to said calling party in response to being informed of said first call.

17. The method of claim 16 wherein sending an instant message to said calling party in response to being informed of said first call comprises sending a WAP message to said calling party in response to being informed of said first call.

18. The method of claim 11 wherein triggering an advertising response comprises sending a coupon to said calling party.

19. The method of claim 18 wherein sending a coupon to the calling party comprises sending an electronic coupon to the caller using WAP.

20. The method of claim 1 wherein determining whether the called party associated with said first called number is a business based on said first called number comprises requesting a reverse directory look-up of said first called number.

21. A method of responding to a call from a calling party to a called party, comprising:
   selecting a target list of phone numbers;
   receiving a first called number from said calling party for a first call;
   determining whether said first called number is on said target list;
   storing information about said first call in response to said first called number being on said target list;

supplying said information about said first call to a third party other than a telecommunications supplier; and said third party triggering an advertising response in response to being informed of said first call.

22. The method of claim 21 wherein triggering an advertising response comprises sending an email message to said calling party in response to being informed of said first call.

23. The method of claim 21 wherein triggering an advertising response comprises mailing a postal advertisement to said calling party in response to being informed of said first call.

24. The method of claim 21 wherein triggering an advertising response comprises sending an SMS message to said calling party in response to being informed of said first call.

25. The method of claim 21 wherein triggering an advertising response comprises placing a phone call to said calling party in response to being informed of said first call.

26. The method of claim 21 wherein triggering an advertising response comprises sending an instant message to said calling party in response to being informed of said first call.

27. The method of claim 26 wherein sending an instant message to said calling party in response to being informed of said first tall comprises sending a WAP message to said calling party in response to being informed of said first call.

28. The method of claim 21 wherein triggering an advertising response comprises sending a coupon to said calling party.

29. The method of claim 28 wherein sending a coupon to the calling party comprises sending an electronic coupon to the caller using WAP.

* * * * *

UNITED STATES PATENT AND TRADEMARK OFFICE
CERTIFICATE OF CORRECTION

PATENT NO.      : 6,628,770 B1
DATED           : September 30, 2003
INVENTOR(S)     : Anuj Kumar Jain and Robert J. Smith It is certified that error appears in the above-identified patent and that said Letters Patent is hereby corrected as shown below:

<u>Title page,</u>
Item [73], Assignee, "Ericsson Inc" should be
-- Telefonaktiebolaget L.M. Ericsson --

Signed and Sealed this

Twenty-fifth Day of November, 2003

JAMES E. ROGAN
*Director of the United States Patent and Trademark Office*